United States Patent [19]

Leung

[11] Patent Number: 5,344,270
[45] Date of Patent: Sep. 6, 1994

[54] METHOD OF AND SYSTEM FOR LOAD STORAGE AND RETRIEVAL

[76] Inventor: Lit-Cheong Leung, 43 Abbey Close, Ancastor, Ontario, Canada, L9G 4L8

[21] Appl. No.: 842,109
[22] PCT Filed: Sep. 21, 1990
[86] PCT No.: PCT/GB90/01466
§ 371 Date: Apr. 20, 1992
§ 102(e) Date: Apr. 20, 1992
[87] PCT Pub. No.: WO91/04207
PCT Pub. Date: Apr. 4, 1991

[30] Foreign Application Priority Data

Sep. 21, 1989 [GB] United Kingdom ............... 8921401

[51] Int. Cl.$^5$ ............................................. B65G 1/06
[52] U.S. Cl. ............................... 414/278; 414/234; 414/239; 414/281
[58] Field of Search ............... 414/234, 235, 239, 241, 414/245, 246, 247, 268, 278, 285, 277, 281-282, 609, 233, 236, 237; 212/205, 209, 221

[56] References Cited

U.S. PATENT DOCUMENTS

| | | | |
|---|---|---|---|
| 1,716,588 | 6/1929 | Kirchner | 414/348 |
| 1,887,667 | 11/1932 | Wheeler | 414/233 |
| 1,955,959 | 4/1934 | Harnischfeger | 414/247 |
| 2,765,928 | 10/1956 | Riemenschneider | 212/221 X |
| 2,899,086 | 8/1959 | Thaon De Saint-Andre | 414/257 X |
| 2,936,082 | 5/1960 | Alimanestiano | 414/234 |
| 3,432,046 | 3/1969 | Krusinski | 212/221 X |
| 3,776,399 | 12/1973 | Atwater | 414/281 |
| 3,982,642 | 9/1976 | Muller | 414/281 X |
| 3,986,623 | 10/1976 | Keller | 414/281 X |
| 4,459,078 | 7/1984 | Chiantella et al. | 414/279 |
| 4,717,305 | 1/1988 | Edwards | 414/268 X |

FOREIGN PATENT DOCUMENTS

| | | | |
|---|---|---|---|
| 0267409 | 12/1968 | Austria | 414/237 |
| 3117434 | 11/1982 | Fed. Rep. of Germany | 414/277 |
| 3304932 | 10/1984 | Fed. Rep. of Germany . | |
| 1244432 | 9/1960 | France | 414/236 |
| 1514497 | 2/1968 | France . | |
| 0498447 | 9/1954 | Italy | 414/239 |
| 0950271 | 2/1964 | United Kingdom . | |
| 0989859 | 4/1965 | United Kingdom | 414/235 |
| 1192235 | 6/1967 | United Kingdom . | |
| 1299348 | 4/1970 | United Kingdom . | |
| 1410891 | 10/1975 | United Kingdom . | |
| 1525848 | 6/1977 | United Kingdom . | |
| 2180827 | 4/1987 | United Kingdom | 414/239 |
| 8000690 | 4/1980 | World Int. Prop. O. | 414/239 |

Primary Examiner—Michael S. Huppert
Assistant Examiner—James Keenan
Attorney, Agent, or Firm—Biebel & French

[57] ABSTRACT

A system for storage and retrieval of a load, for example a motor vehicle, is arranged to be installed, for example, in a multi-storey car parking building. The system includes a plurality of substantially parallel conveyor belts installed at floor level on at least one floor of the building and an overhead pulley unit, which moves a pulley block along a direction substantially perpendicular to the conveying direction of the conveyor belts and itself moves along a direction substantially parallel with the conveying direction. Containers are dimensioned to contain the load, and the containerized load is conveyed to and from a vacant storage space located on either side of the conveyor belts by the conveyor belt and pulley system. Lifts for carrying the containerized loads may be located at the end of the conveyor belts provided on floors above and/or below ground level.

16 Claims, 2 Drawing Sheets

METHOD OF AND SYSTEM FOR LOAD STORAGE AND RETRIEVAL

FIELD OF THE INVENTION

The present invention relates to a method and system for storing and retrieving loads, for example parking motor vehicles, i.e. cars, vans. Lorries, etc, in a car park, or storing goods or other types of loads in a warehouse.

BACKGROUND OF THE INVENTION

In large cities, thousands of cars, trucks, vans and buses run on the roads beside modern and sophisticated underground mass transit systems. For the majority of drivers of motor vehicles in such large and inevitably crowded cities, car-parking has always been a problem because of the scarcity of parking space available on the one hand, and the considerable amount of expenses involved on the other. To meet ever increasing demands of motor drivers for parking space, more and more multi-storey car parks are built. Such multi-storey car parks are often erected in busy commercial areas with exorbitant land value, and their costs, in terms of construction as well as land value, are extremely high.

However, due to the fact that present multi-storey car park designs require driveways for in-coming and out-going vehicles on every level between the parking spaces, as well as spiral driveways to reach each level, much of the available floor area cannot actually be used for the very purpose for which the car park was built.

Similar problems can also occurs in large warehouses in which goods or other loads to be stored have to be transported to and from different areas within the warehouse, and traffic congestion tends to build up around the warehouse terminals.

SUMMARY OF THE INVENTION

It is therefore an object of the present invention to provide a method of and system for storing and retrieving loads which enables optimum use to be made of the available storage space and is also capable of reducing costs of construction, maintenance and operation of the storage buildings, such as car parks or warehouses.

Accordingly, one aspect of the present invention consists in a method of storing a load in a multi-storey building and retrieving the load therefrom, the building having a plurality of storeys, situated above, on and/or the method comprising the steps of:

containerizing the load in a container adapted for storing the load, conveying the containerized load to a vacant one of said storage spaces on one of said storeys by conveying belt and pulley means, and subsequently conveying the containerized load by said conveying belt and pulley means from said storage space to a load collecting location for retrieval of the load from the container, and being characterized by the steps of:

lifting or lowering said containerized load, where necessary, to and from said storey having said vacant storage space by means of a lift arrangement, and once on said storey containing said vacant storage space, conveying said containerized load between said lift arrangement and said vacant storage spade by means of said conveying belt and pulley means including a conveyor located on said storey at floor level adjacent or between said storage spaces, and a pulley mechanism installed on said storey above said conveyor for transferring said containerized load between said conveyor and said storage space.

Another aspect of the present invention consists in a system for storing a load in a multi-storey building and retrieving the load therefrom, the building having a plurality of storeys, situated above, on and/or below ground level, with a plurality of storage spaces located thereon, the system comprising a plurality of containers each adapted for storing a load, and conveying belt and pulley means for conveying the containerized load to a vacant one of said storage spaces and subsequently conveying the containerized load from said storage space to a load collecting location for retrieval of the load from the container, characterized in that the system also includes a lift arrangement for lifting or lowering the containerized load, where necessary, to and from the storey having said vacant storage space, and said conveying belt and pulley means comprise, on each of said storeys, a conveyor located at floor level adjacent or between the storage spaces on said storey for conveying said containerized load between said lift arrangement and said vacant storage space and a pulley mechanism installed above said conveyor on said storey for transferring said containerized load between said conveyor and said vacant storage space.

In one embodiment, the conveying belt and pulley means is adapted to convey the containerized load along two mutually perpendicular directions on the or each storey. Where more than one conveyor is provided, they are arranged spaced apart and substantially parallel to each other with storage spaces being provided therebetween. The pulley mechanism is adapted to convey the containerized load in a direction substantially perpendicular to the conveying direction of the conveyor and is itself movable, preferably by computer control, along a direction parallel to said conveying direction of the conveyor.

The lift arrangement includes a lift located at one or both ends of the or each conveyor on each storey. Preferably each lift includes means, for example rollers, for transferring the containerized load between the lift and the conveyor at the end of which the lift is located.

The load containerizing means may comprise containers preferably of different dimensions for containing different size loads. One or more of the side walls of each container may be formed by a closure member, preferably in the form of a collapsible or folding gate, for gaining access to the interior of the container. Each container may also be provided with integral wheels or ball-bearings to facilitate conveyancing.

In one embodiment, the load is suitably a motor vehicle, for example a car, van, lorry, etc, which is intended to be parked in a multi-storey building by use of the present invention. In another embodiment, the load may consist of goods or other types of loads to be stored in accordance with the present invention, in a large multi-storey warehouse.

BRIEF DESCRIPTION OF THE DRAWINGS

The invention will be further described by way of example with reference to the accompanying drawings, in which.

DESCRIPTION OF THE PREFERRED EMBODIMENTS

Figure 1:
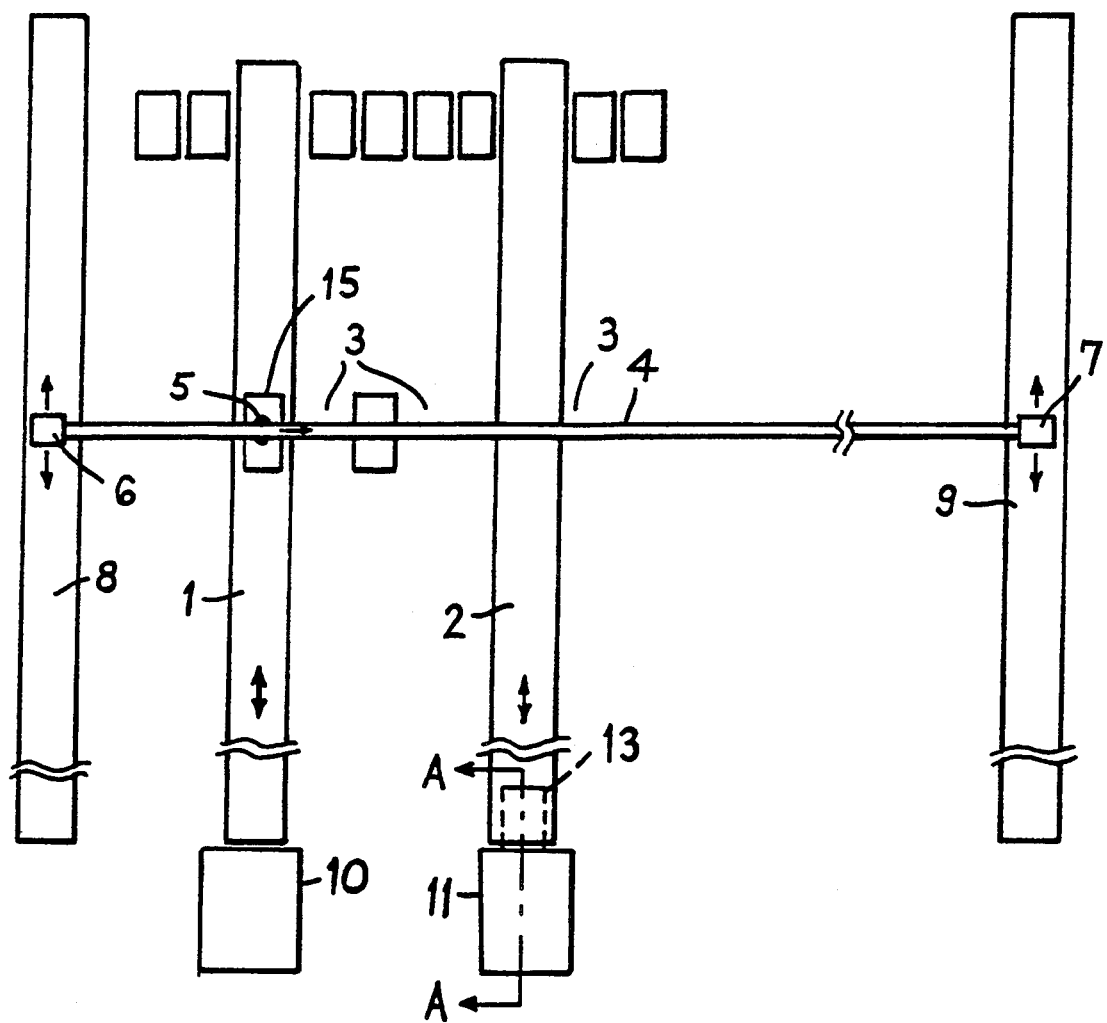
FIG. 1 shows schematically a plan view of a system in accordance with one embodiment of the present invention.
Figure 2:
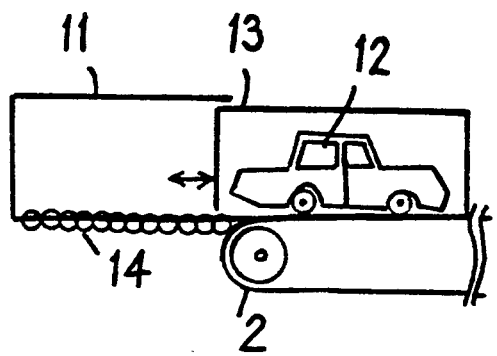
FIG. 2 shows schematically a sectional view along A—A of FIG. 1.

Referring now to the Figures, there is illustrated a system, in accordance with one embodiment of the present invention, which is installed on one level of a multi-storey car parking building. The system includes two substantially parallel conveyor belts 1, 2 installed at floor level. The belts are spaced apart by a distance sufficient to provide four storage spaces 3 therebetween in a line perpendicular to the conveyor belts. Storage spaces 3 are also provided on the outer sides of the conveyor belts, 1, 2. An overhead pulley unit 4 moves at least one pulley block 5 with magnetic pads along a direction perpendicular to the conveying direction of the conveyor belts 1, 2 and the pulley unit 4 itself moves by rollers 6, 7 along overhead tracks 8, 9 along a direction substantially parallel with the conveying direction of the conveyor belts 1, 2.

At the end of each conveyor belt, a lift 10, 11 is located. Each motor vehicle 12 is driven into a container 13 on the ground level and is conveyed to a level where there is an available storage space in a lift 11. Each lift is provided with motor-driven rollers 14 which transfer the container 13 to a conveyor belt 2. The conveyor belt moves the container to a point along side the available space and the pulley unit 4 moves the pulley block 5 so that the magnetic pads engage with the container and the container is pulled across into the space, as shown by container 15 in FIG. 1.

In order to retrieve the load stored in the container at a later time, the operation is merely reversed to convey the container back to the lift and down or up to the ground level for collection of the load from the container.

Figure 3:
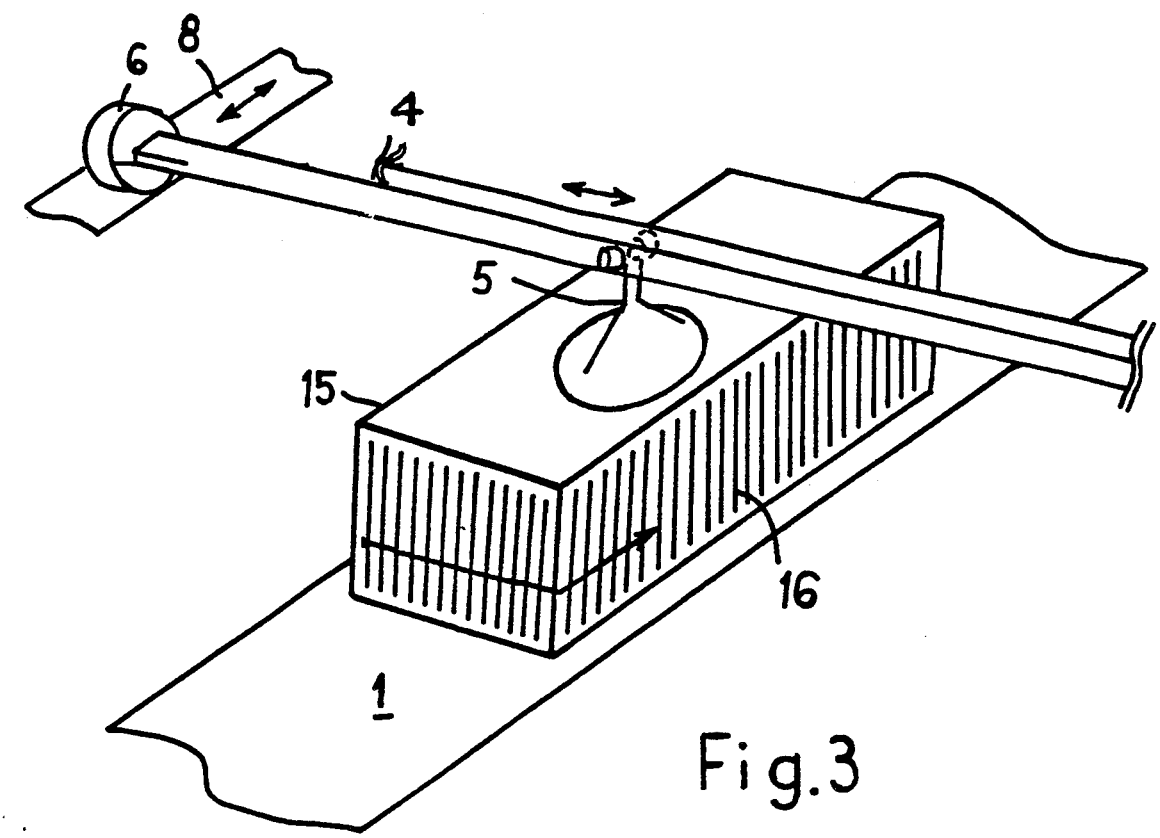
FIG. 3 shows schematically an enlarged perspective view of a container used in the embodiment in FIGS. 1 and 2.

As shown in FIG. 3, each container 15 preferably has a collapsible or folding gate 16 which extends around two sides of the container so that a motor vehicle can be easily driven into the container and the gate is then closed to contain the vehicle.

Each container is also provided with integral wheels or ball-bearings (not shown) on its underside for easy movement of the container. The bottom of the container is made from a material strong enough to support the weight of the load and the other parts of the container are suitably made from light-weight materials. It is not essential that the container has a top, as the pulley block can easily be adapted to engage with other parts of the container.

The levels of the multi-storey car parking building can have different headrooms so that many vehicles of different heights can be accommodated with, for example, vans on one level, trucks on another, and small cars on yet another level. In this respect, each lift is suitably dimensioned to accommodate the largest of such vehicles. The containers can also be of different dimensions to fit the different sized vehicles.

The building may have suitable lighting and air-conditioning so that windows are not necessary and from the outside the building may resemble a conventional multi-storey warehouse. The ground floor level may accommodate a computer control for controlling the system, an area for people waiting to park or retrieve their vehicles, and another area may be designated a fee collector. The other levels of the building can then be used solely for storage space utilising the present system.

The control (not shown) of the system in accordance with this embodiment of the present invention consists of a computer for recording and locating the stored vehicles and for de-registering them after they have been retrieved; an electronic device for controlling the lifts, the conveyor belts and the pulley units, the movements of which can be monitored on a video screen; and an electronic security/fire-fighting system.

The advantages of such a system for car parking are numerous, some of them being as follows:

(a) Maximisation of parking space—In traditional multi-storey car parks, driveways can occupy up to 50% of the available floor area, thereby reducing much of the space for parking cars. On the contrary, the present system only requires space for the belt and pulley arrangement, thus leaving about 80% of the floor for parking.

(b) Availability of parking for vehicles of all sizes—Traditional multi-storey car parks cannot generally accommodate large vehicles such as trucks and buses, because it is impossible to drive them around sharp corners of the narrow driveways. The present system can, however, accommodate vehicles of all sizes from huge trucks to small saloon cars.

(c) Reduction in construction costs—For parking of saloon cars and vans as in traditional multi-storey car parks, a headroom of about 2 meters would be quite sufficient in the present system. Therefore, the headroom required for two storeys in a traditional multi-storey car park would be sufficient to provide three storeys in the present system, so that there should be savings in construction costs. Also, without the need to build driveways in the present system, substantial reductions in the cost of construction are inevitable.

(d) Prevention of crime and vandalism—With few exceptions, multi-storey car parks are black spots for crimes in large cities all over the world. Since no persons other than those engaged in maintenance or repair work would have access to the storage building using the present system, crime or vandalism should not, in theory, occur there.

(e) Prevention of accidents—From time to time, accidents, albeit largely minor in nature, occur in traditional multi-storey car parks resulting in personal injuries or damage to vehicles. In the present system, these accidents would rarely occur, and coupled with the elimination of vandalism in these car parks, insurers should have less reasons to increase insurance premiums.

(f) Reduction in maintenance work—To keep traditional multi-storey car parks in decent and reasonable conditions, the driveways have to be repaired, walls white-washed, and signs re-painted on a regular basis. However, except for the outer walls, none of these is necessary in the present system. The only maintenance required is to the conveyor and lifting equipment, thus reducing the overall cost of maintenance.

(g) Reduction in operational costs—Remuneration for staff constitutes the major operational costs of a traditional multi-storey car park apart from rent of the building. The staff costs should be less in the present system since fewer refuse collectors and cleaners would be required and security guards would be redundant.

(h) Benefits to customers—Customers would be benefitted because of the time saved in driving up and down the driveways and queuing up for the passenger lift as in conventional car parks. They would, undoubtedly, benefit from the improved conditions in the waiting hall and could enjoy better facilities there as well.

Figure 4:
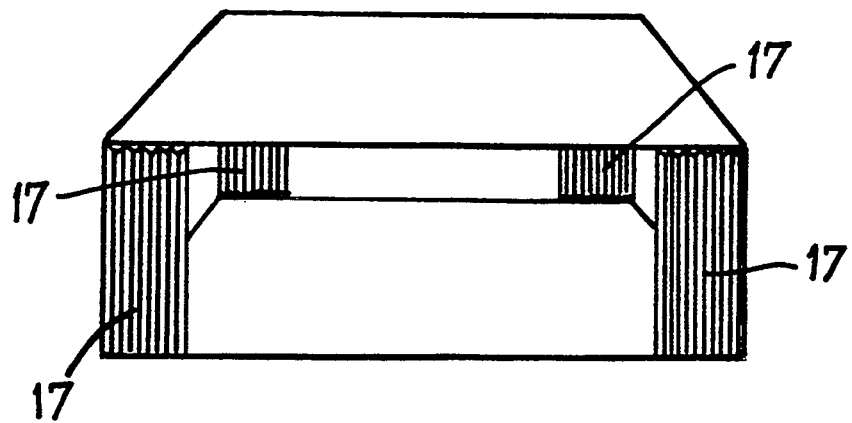
FIG. 4 shows an alternative form of the container shown in FIG. 3.

In an alternative embodiment of the present invention, the present system can be installed in a multi-storey warehouse for storing goods or other loads. The system would operate in substantially the same manner as described hereinabove in relation to the car park, but it may be preferable to modify the container as shown in FIG. 4. In this Figure, all four sides of the container consist of collapsible or folding gates 17 in order to facilitate the movements of goods or other loads to and from the container. Also the body of this container should be made from a stronger material than that used in the container shown in FIG. 3. It will be envisaged that this embodiment of the invention has all the advantages listed above in relation to the car park embodiment.

Whilst particular embodiments of the present invention have been described, various modifications will be envisaged without departure from the scope of the invention.

I claim:

1. A method of storing a load in a multi-story building and retrieving the load therefrom, the building having a plurality of storeys, with storage spaces located thereon, the method comprising the steps of:
   containerizing the load in a container adapted for storing the load,
   conveying the containerized load to a vacant one of said storage spaces on one of said storeys by conveying belt and pulley means, and
   subsequently conveying the containerized load by said conveying belt and pulley means from said storage space to a load collecting location for retrieval of the load from the container, wherein said conveying of the containerized load comprises the steps of:
   moving said containerized load, to and from said storey having said vacant storage space by means of a lift arrangement, and
   once on said storey containing said vacant storage space, conveying said containerized load between said lift arrangement and said vacant storage space by means of said conveying belt and pulley means including a conveyor located on said storey at floor level alongside said storage spaces, and a pulley mechanism installed on said storey above said conveyor for transferring said containerized load between said conveyor and said storage space.

2. A method as claimed in claim 1, wherein on said storey containing said vacant storage space, said containerized load is conveyed by said conveyor along a conveying direction and transferred by said pulley mechanism along a direction substantially perpendicular to said conveying direction.

3. A method as claimed in claim 1, wherein said lift arrangement comprises at least one lift located adjacent at least one end of said conveyor.

4. A method as claimed in claim 1, wherein the load is a motor vehicle.

5. A system for storing a load in a multi-storey building and retrieving the load therefrom, the building having a plurality of storeys, with a plurality of storage spaces located thereon, the system comprising a plurality of containers each adapted for storing a load, and conveying belt and pulley means for conveying the containerized load to a vacant one of said storage spaces and subsequently conveying the containerized load from said storage space to a load collecting location for retrieval of the load from the container, wherein the system also includes a lift arrangement for vertically shifting the containerized load to and from the storey having said vacant storage space, and said conveying belt and pulley means comprise, on each of said storeys, a conveyor located at floor level alongside the storage spaces on said storey for conveying said containerized load between said lift arrangement and said vacant storage space and a pulley mechanism installed above said conveyor on said storey for transferring said containerized load between said conveyor and said vacant storage space.

6. A system as claimed in claim 5, wherein the conveying belt and pulley means are adapted to convey the containerized load along two directions substantially perpendicular to each other on each of said storeys.

7. A system as claimed in claim 6, wherein the pulley mechanism is arranged to transfer the containerized load in a direction substantially perpendicular to the conveying direction of the conveyor and to be itself movable along a direction substantially parallel to said conveying direction of the conveyor.

8. A system as claimed in claim 5, wherein more than one conveyor is provided on each of said storeys and the conveyors are arranged spaced apart and substantially parallel to each other with storage spaces being provided therebetween.

9. A system as claimed in claim 5, wherein the lift arrangement comprises at least one lift located adjacent; at least one end of said conveyor.

10. A system as claimed in claim 9, wherein the at least one lift includes means for transferring the containerized load between the lift and the conveyor at the end of which the lift is located.

11. A system as claimed in claim 5, wherein the containers are of different dimensions for containing different size loads.

12. A system as claimed in claim 5, wherein at least one side wall of each container is formed by a closure member for gaining access to the interior of the container.

13. A system as claimed in claim 12, wherein the closure member is in the form of a collapsible or folding gate.

14. A system as claimed in claim 5, wherein each container is provided with integral wheels or ball-bearings to facilitate conveying thereof.

15. A system as claimed in claim 5, wherein the load is a motor vehicle.

16. A system as claimed in claim 5, wherein said plurality of storeys differ in height so that loads of different heights can be stored.

* * * * *